United States Patent
Ojima et al.

(10) Patent No.: US 9,573,453 B2
(45) Date of Patent: Feb. 21, 2017

(54) VEHICLE BATTERY UNIT INSTALLATION APPARATUS

(75) Inventors: Yoshio Ojima, Kariya (JP); Takahiro Fukagawa, Kariya (JP); Takashi Murase, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 230 days.

(21) Appl. No.: 14/127,565

(22) PCT Filed: Jun. 6, 2012

(86) PCT No.: PCT/JP2012/064529
§ 371 (c)(1),
(2), (4) Date: Dec. 19, 2013

(87) PCT Pub. No.: WO2012/176619
PCT Pub. Date: Dec. 27, 2012

(65) Prior Publication Data
US 2014/0165354 A1    Jun. 19, 2014

(30) Foreign Application Priority Data
Jun. 20, 2011    (JP) ................. 2011-136803

(51) Int. Cl.
*B60K 1/04*    (2006.01)
*B60S 5/06*    (2006.01)
(Continued)

(52) U.S. Cl.
CPC ............. *B60K 1/04* (2013.01); *B60L 11/1822* (2013.01); *B60S 5/06* (2013.01);
(Continued)

(58) Field of Classification Search
CPC ............. B60R 16/04; B60K 1/04; B60S 5/06; E05B 2015/023; E05B 2015/0235; E05B 15/0295; E05B 15/02
(Continued)

(56) References Cited

U.S. PATENT DOCUMENTS 3,572,062 A * 3/1971 Beebe ..................... E05B 67/38
                                                              292/205
4,671,548 A * 6/1987 Haberle ................... E05B 83/16
                                                              292/216
(Continued)

FOREIGN PATENT DOCUMENTS

CN    101610928 A    12/2009
CN    101987613       * 3/2011
(Continued)

OTHER PUBLICATIONS

Communication dated Jul. 27, 2015 from the State Intellectual Property Office of the People's Republic of China in counterpart application No. 201280029986.4.
(Continued)

*Primary Examiner* — Larry E Waggle, Jr.
*Assistant Examiner* — Mahdi H Nejad
(74) *Attorney, Agent, or Firm* — Sughrue Mion, PLLC

(57) ABSTRACT

A vehicle body has, in a state in which a battery unit is not installed, a frame configuring a part of the lower surface of the vehicle body. A vehicle battery unit installation apparatus for installing a battery unit in the lower part of the vehicle body includes: a striker device configured to be secured to the vehicle body and a locking device secured to the battery unit. The striker device includes a base plate and a striker secured to the base plate. The striker has a support part capable of supporting a load. The locking device is capable of securing the support part. The base plate is configured to
(Continued)

be secured to the frame. The striker has ends secured to the base plate such that the support part is located below the frame.

6 Claims, 15 Drawing Sheets

(51) Int. Cl.
   *B60L 11/18* (2006.01)
   *B60R 16/04* (2006.01)
(52) U.S. Cl.
   CPC .............. *B60K 2001/0438* (2013.01); *B60K 2001/0472* (2013.01); *B60R 16/04* (2013.01); *Y02T 10/7005* (2013.01); *Y02T 10/7072* (2013.01); *Y02T 90/124* (2013.01); *Y02T 90/14* (2013.01); *Y10T 29/53961* (2015.01)
(58) Field of Classification Search
   USPC ....... 180/68.5, 65.1; 292/340, 213–216, 254, 292/26, 28, 11, 341; 29/281.1
   See application file for complete search history.

(56) References Cited

U.S. PATENT DOCUMENTS

| | | | | |
|---|---|---|---|---|
| 5,529,356 A * | 6/1996 | Cetnar | ................ | E05B 85/045 292/340 |
| 5,833,024 A * | 11/1998 | Kaneko | ................ | B62D 25/105 180/69.2 |
| 6,000,737 A * | 12/1999 | Yiu | ................ | E05B 85/045 292/340 |
| 6,010,164 A * | 1/2000 | Yoda | ................ | E05B 77/02 292/216 |
| 6,485,071 B2 * | 11/2002 | Schwaiger | ................ | E05B 83/16 292/216 |
| 7,398,849 B2 * | 7/2008 | Yoshida | ................ | B60K 1/04 180/68.5 |
| 7,631,928 B2 * | 12/2009 | Ackland | ................ | B62D 25/105 296/193.11 |
| 7,654,351 B2 * | 2/2010 | Koike | ................ | B60K 1/04 180/68.1 |
| 7,854,452 B2 * | 12/2010 | Nishio | ................ | B21F 45/00 292/340 |
| 7,913,788 B1 | 3/2011 | Bryer et al. | | |
| 8,210,301 B2 * | 7/2012 | Hashimoto | ................ | B60K 1/04 180/68.5 |
| 8,403,405 B2 * | 3/2013 | Ikeda | ................ | B60R 21/34 296/187.04 |
| 8,608,213 B2 * | 12/2013 | Homner | ................ | B64D 11/003 292/340 |
| 8,795,876 B2 * | 8/2014 | Thomas | ................ | H01M 2/1083 180/65.29 |
| 8,801,052 B2 * | 8/2014 | Bender | ................ | E05B 83/16 292/216 |
| 8,882,160 B2 * | 11/2014 | Kamata | ................ | B60N 2/366 292/216 |
| 8,925,983 B2 * | 1/2015 | Ohgitani | ................ | B60K 1/04 292/213 |
| 8,967,312 B2 * | 3/2015 | Yanagi | ................ | B60K 1/04 180/68.5 |
| 2008/0173488 A1 * | 7/2008 | Takasaki | ................ | B60K 1/04 180/68.5 |
| 2009/0025989 A1 * | 1/2009 | Takaku | ................ | B60K 1/04 180/65.1 |
| 2009/0079208 A1 * | 3/2009 | Mizuno | ................ | B21K 25/00 292/340 |
| 2009/0236162 A1 * | 9/2009 | Takasaki | ................ | B60K 1/04 180/68.5 |
| 2010/0071979 A1 * | 3/2010 | Heichal | ................ | B60K 1/04 180/68.5 |
| 2010/0175940 A1 | 7/2010 | Taneda et al. | | |
| 2010/0307848 A1 * | 12/2010 | Hashimoto | ................ | B60K 1/04 180/68.5 |
| 2011/0169303 A1 * | 7/2011 | Ikeda | ................ | B60R 21/34 296/193.11 |
| 2011/0304160 A1 * | 12/2011 | Kamata | ................ | B60N 2/366 292/197 |
| 2012/0018235 A1 * | 1/2012 | O'Quinn | ................ | B60K 1/04 180/65.1 |
| 2012/0073888 A1 | 3/2012 | Taneda et al. | | |
| 2012/0217077 A1 | 8/2012 | Ojima et al. | | |
| 2012/0321381 A1 * | 12/2012 | Ohgitani | ................ | B60K 1/04 403/376 |
| 2014/0014428 A1 * | 1/2014 | Yanagi | ................ | B60K 1/04 180/68.5 |

FOREIGN PATENT DOCUMENTS

| | | | |
|---|---|---|---|
| DE | 4229687 A1 | | 3/1994 |
| EP | 2269879 A1 | | 1/2011 |
| FR | 2880476 A1 | | 7/2006 |
| FR | 2943970 | * | 10/2010 |
| FR | 2943970 A3 | | 10/2010 |
| JP | 50-68225 U | | 6/1975 |
| JP | 11-321714 A | | 11/1999 |
| JP | 2002-362261 A | | 12/2002 |
| JP | 2003-118397 A | | 4/2003 |
| JP | 2010-184621 A | | 8/2010 |
| JP | 2009-192825 | * | 3/2011 |
| WO | 2010/033881 A1 | | 3/2010 |
| WO | 2011/055687 A1 | | 5/2011 |
| WO | WO 2011/055687 | * | 5/2011 |
| WO | WO 2011055687 | * | 5/2011 |

OTHER PUBLICATIONS

International Preliminary Report on Patentability and Written Opinion, dated Dec. 23, 2013, issued by the International Searching Authority, in counterpart Application No. PCT/JP2012/064529.
International Search Report of PCT/JP2012/064529 dated Jul. 31, 2012.
Communication dated Mar. 12, 2015 from the European Patent Office in counterpart Application No. 12802669.7.

\* cited by examiner

VEHICLE BATTERY UNIT INSTALLATION APPARATUS

CROSS REFERENCE TO RELATED APPLICATIONS

This is a National Stage of International Application No. PCT/JP2012/064529 filed Jun. 6, 2012, claiming priority based on Japanese Patent Application No. 2011-136803 filed Jun. 20, 2011, the contents of all of which are incorporated herein by reference in their entirety.

FIELD OF THE INVENTION

The present invention relates to a vehicle battery unit installation apparatus used in a vehicle such as an electric vehicle capable of detaching or attaching a battery unit.

BACKGROUND OF THE INVENTION

In a vehicle such as an electric vehicle that is spreading widely, batteries are installed as a supply source of electric power for a traveling motor. The batteries are housed in a case as a battery unit. The battery unit is installed in the vehicle body. In such an electric vehicle, in a case where electric power stored in the battery unit installed in the vehicle body is discharged, it is necessary to charge the battery unit, or replace the discharged battery unit with a charged battery unit. The type of the electric vehicle requiring the replacement of the battery unit includes an electric vehicle enabling the installation of a battery unit on the bottom part of a vehicle body and enabling replacement of the battery unit from below the vehicle body by using a battery unit installation apparatus. In such a battery unit replacement method, various vehicle battery unit installation apparatuses are proposed in order to install the battery unit in the vehicle body efficiently.

For example, a vehicle battery unit installation apparatus disclosed in Patent Document 1 includes a bolt, provided to vertically extend on the lower part of a vehicle body, and a nut secured to the bolt. In the vehicle battery unit installation apparatus, a battery unit can be installed in the lower part of the vehicle body by using the bolt and the nut.

PRIOR ART DOCUMENT

Patent Document

Patent Document 1: Japanese Laid-Open Patent Publication No. 2010-184621

SUMMARY OF THE INVENTION

However, in the aforementioned conventional vehicle battery unit installation apparatus, when the battery unit is installed in the vehicle body, the load of the battery unit acts in the axial direction of the bolt. Therefore, it is difficult for the bolt to support the load, and there is a possibility that the battery unit cannot be firmly installed in the vehicle body.

An object of the present invention is to provide a vehicle battery unit installation apparatus capable of reliably installing a battery unit in a vehicle body.

One aspect of the present invention provides a vehicle battery unit installation apparatus for installing a battery unit in a lower part of a vehicle body, the vehicle body has a frame configuring a part of a lower surface of the vehicle body in a state where the battery unit is not installed, the vehicle battery unit installation apparatus includes: a striker device configured to be secured to the vehicle body, wherein the striker device includes a base plate, and a striker secured to the base plate, and wherein the striker has a support part capable of supporting a load; and a locking device secured to the battery unit and capable of securing the support part, wherein the base plate is configured to be secured to the frame, and the striker has ends secured to the base plate such that the support part is located below the frame.

In the vehicle battery unit installation apparatus according to the aspect, the support part of the striker device secured to the vehicle body is secured to the locking device secured to the battery unit, so that the battery unit can be installed in the lower part of the vehicle body. The striker device has the base plate and the striker secured to the base plate. The base plate is secured to the frame configuring a part of the lower surface of the vehicle body. Additionally, the striker has the support part. The striker has the ends secured to the base plate such that the support part is located below the frame. Therefore, the load of the battery unit is shared by the ends of the support part to be transmitted to the base plate, and is supported by the frame. Therefore, the battery unit can be firmly installed in the vehicle body.

Accordingly, in the vehicle battery unit installation apparatus of the present invention, the battery unit can be reliably installed in the vehicle body.

Additionally, in the vehicle battery unit installation apparatus of the present invention, the support part is located at the lower part of the frame. Therefore, compared to a case where the support part is located on the side of the frame, the battery unit can be brought closer to the frame and as large a battery unit as possible can be installed in the vehicle body.

The vehicle battery unit installation apparatus of the present invention can be mainly employed as an apparatus for installing a battery unit in a vehicle body in a vehicle that travels by electric power stored in the batteries. Additionally, the vehicle battery unit installation apparatus can be employed as an apparatus for installing a battery unit in a vehicle body in a vehicle that travels by fuel such as gasoline and gas oil. In the present invention, the concept of the vehicle body includes not only vehicle bodies for automobiles, but also vehicle bodies for industrial vehicles such as forklifts, automatic conveyance vehicle, and the like.

In the vehicle battery unit installation apparatus of the present invention, the number of striker devices and the number of locking devices are not limited, and the number of striker devices and the number of locking devices can be arbitrarily changed according to the load of the battery unit.

Furthermore, also in the frame provided in the vehicle body, the shape thereof is not limited and can be variously changed according to the shape of the vehicle body or the battery unit. At this time, a space enabling mounting of the battery unit on the lower part of the vehicle body may be provided, and the frame may be provided in the space. Or the frame may protrude to the lower part of the vehicle body. The vehicle body and the frame may be integrally formed, or the vehicle body and the frame may be independently formed.

Particularly, the frame can have a pair of frame side walls and a frame lower wall connected to lower ends of the frame side walls. The base plate can have a base plate lower wall extending substantially parallel to the frame lower wall and secured to the frame lower wall. At least a first end of the striker preferably extends upward from the support part, thereafter preferably extends parallel to the base plate lower wall, and is preferably welded to an upper surface of the base plate lower wall.

In this case, since the frame lower wall and the base plate lower wall are substantially parallel to each other, the base plate lower wall can be suitably secured to the frame lower wall. Consequently, the striker device can be firmly secured to the frame, and the aforementioned load of the striker device can be suitably shared by the frame. Additionally, the first end of the striker is secured to the base plate lower wall in a state of being placed on the upper surface of the base plate lower wall, and hence one end of the support part is reliably supported on the upper surface of the base plate lower wall. Thus, the durability of the striker device is improved, and the reliability of the installation of the battery unit in the vehicle body is improved.

The base plate can have a base plate side wall formed by bending and extending an end of the base plate lower wall along the frame side walls. A second end of the striker preferably extends upward from the support part and is preferably welded to the base plate side wall.

In this case, the respective ends of the striker are secured to the base plate lower wall and the base plate side wall, and the ends of the support part are reliably supported by the base plate. Therefore, the durability of the striker device is further improved.

The base plate can be secured to the frame with a plurality of bolts. The frame is preferably provided with a back plate jointed with the base plate by means of the bolts.

In this case, the striker device can be easily secured to the frame. Additionally, the necessary part of the frame is reinforced by the back plate, and hence the frame can be effectively reinforced.

In the vehicle battery unit installation apparatus of the present invention, the battery unit can be detached from the lower part of the vehicle body. The locking device can have: a housing formed with an entering opening enabling entering of the support part; a latch pivotally supported about a first swing shaft center with respect to the housing and enabling switching between a locking state, where the support part is locked in the entering opening, and a released state, where the support part is released in the entering opening; and a pawl capable of regulating the swinging motion of the latch. The latch is preferably located on a vertical line passing the centroid in a cross section of the frame, in a state where the battery unit is installed in the vehicle body.

In this case, the latch in the locking state locks the support part, so that the support part can be secured to the locking device. On the other hand, the latch in the locking state swings to be brought into the released state, so that the support part locked by the latch is released, and hence the securing of the locking part by the locking device can be released. Thus, in the vehicle battery unit installation apparatus, the securing and the release between the vehicle body and the battery unit can be easily performed. Additionally, in the vehicle battery unit installation apparatus, the swing of the latch in the locking state is regulated by the pawl, and hence the securing of the support part by the locking device is reliably performed.

In the state where the battery unit is installed in the vehicle body, the latch is located on the vertical line passing the centroid in the cross section of the frame, so that the load of the battery unit acts along the central axis of the strength of the cross section of the frame. Consequently, in the vehicle battery unit installation apparatus, a load does not act on the frame in such a direction that the frame is twisted, and the battery unit can be more reliably installed in the vehicle body.

The wording "on the vertical line of the centroid" means "on the vertical line passing the centroid of the cross section of the frame in a state where the vehicle body is horizontally located". Additionally, the wording "centroid in the cross section of the frame" means "centroid on a closed cross section formed by the single frame, or combination of the frame and other parts formed by a vehicle body frame".

The frame can include a plurality of side members extending in the longitudinal direction of the vehicle body. The base plate can be secured to each of the side members. The locking device is preferably provided on the side surface of the battery unit. In this case, the load of the battery unit can be suitably supported by each of the side members.

The pawl can include pivotally supported about a second swing shaft center with respect to the housing between a first position, where the swing of the latch can be regulated, and a second position, where the swing of the latch can be allowed. A lock releasing part configured to swing the pawl from the first position to the second position is preferably provided.

In this case, when the lock releasing part swings the pawl from the first position to the second position, the securing of the support part by the locking device can be released. Therefore, in the vehicle battery unit installation apparatus, the battery unit can be easily detached from the vehicle body. As the lock releasing parts, for example, a key or a pin can be employed.

EFFECTS OF THE INVENTION

According to the vehicle battery unit installation apparatus of the present invention, the battery unit can be easily and reliably installed in the vehicle body.

BRIEF DESCRIPTION OF THE DRAWINGS

FIG. 5(A) and FIG. 5(B) are perspective views each showing a striker device, according to the vehicle battery unit installation apparatus of the first embodiment, wherein FIG. 5(A) is a perspective view as viewed from the rear surface of the striker device secured to a side member, and FIG. 5(B) is a perspective view as viewed from the front surface of the striker device;

FIG. 7(A) and FIG. 7(B) are side elevational views each showing the pin according to the vehicle battery unit installation apparatus of the first embodiment, wherein FIG. 7(A) shows a pin of a first length, and FIG. 7(B) shows a pin of a second length;

DETAILED DESCRIPTION OF THE PREFERRED EMBODIMENTS

Figure 1:
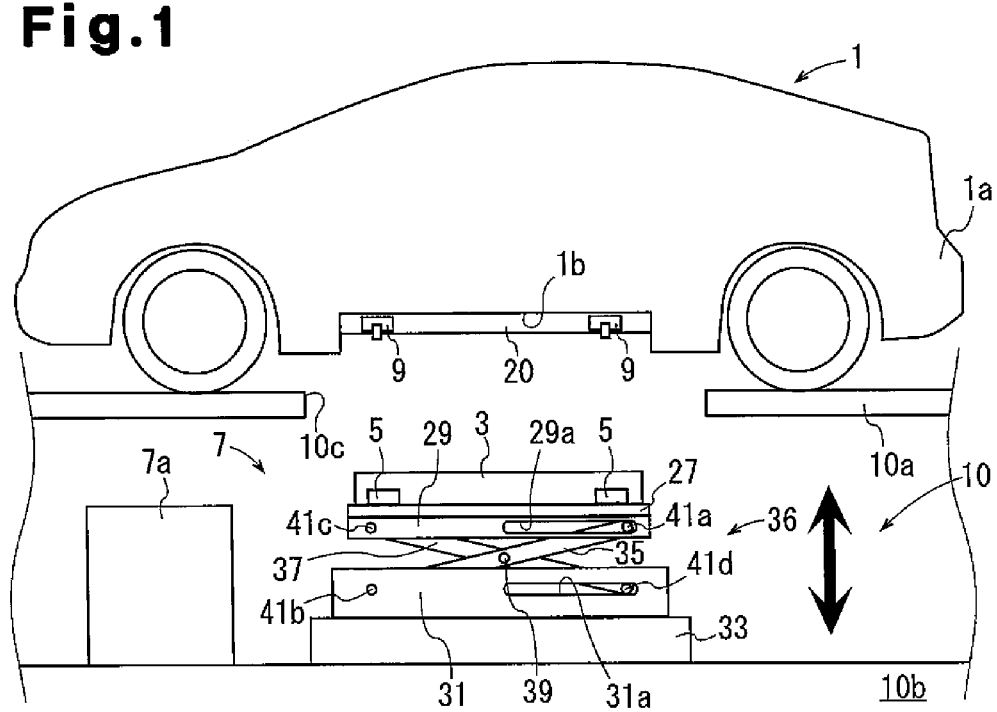
FIG. 1 is a side elevational view showing a state where a battery unit is detached from a vehicle body.
Figure 2:
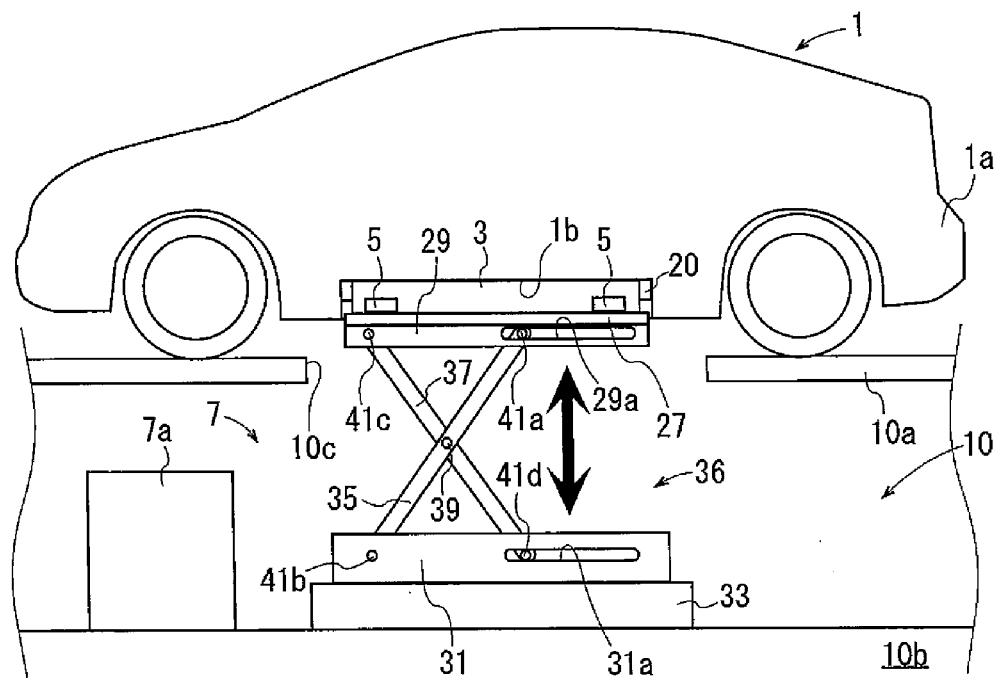
FIG. 2 is a side elevational view showing a state where the battery unit is installed in a vehicle body.

Hereinafter, first and second embodiments, and modifications 1 and 2 of the present invention will be described with reference to the figures. As shown in FIG. 1 and FIG. 2, a vehicle battery unit installation apparatus of each of the first and second embodiments and the modifications 1 and 2 installs a battery unit 3 in a vehicle body 1a of an electric vehicle 1, and detaches the battery unit 3 from the vehicle body 1a in a battery mounting station 10 (hereinafter, referred to as a station 10).

The station 10 has an upper floor 10a and a lower floor 10b. The station 10 is formed with a communication opening 10c for communicating the upper floor 10a and the lower floor 10b. On the upper floor 10a, the electric vehicle 1 can be arranged. On the lower floor 10b, a transfer apparatus 7 is arranged.

The electric vehicle 1 is formed with a mounting space 1b capable of mounting the battery unit 3 on the lower part of the vehicle body 1a. The vehicle body 1a is provided with side members 20 as a pair of frames, extending in the longitudinal direction of the vehicle body 1a. The configuration of the side members 20 will be described later.

(First Embodiment)

Figure 7A:
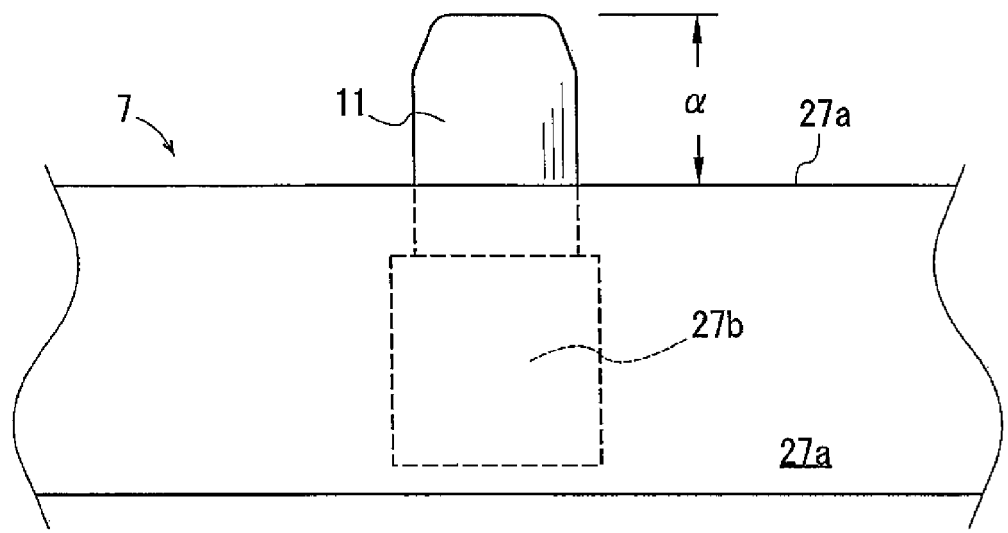
Figure 7B:
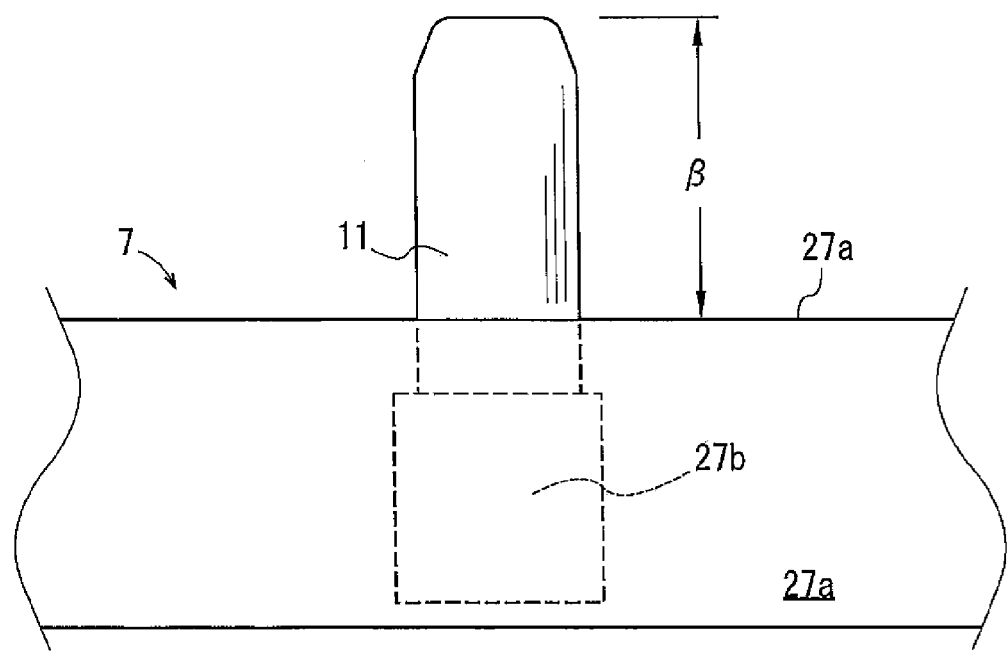

The vehicle battery unit installation apparatus of the first embodiment includes striker devices 9, locking devices 5, and pins 11 and first solenoids 27b (see FIG. 7(A) and FIG. 7(B)) that serve as lock releasing parts. The vehicle battery unit installation apparatus is provided with the four striker devices 9, the four locking devices 5, the four pins 11, and the four first solenoids 27b. As shown in FIG. 1, each striker device 9 is provided in the vehicle body 1a, and each locking device 5 is provided in the battery unit 3.

Figure 4:
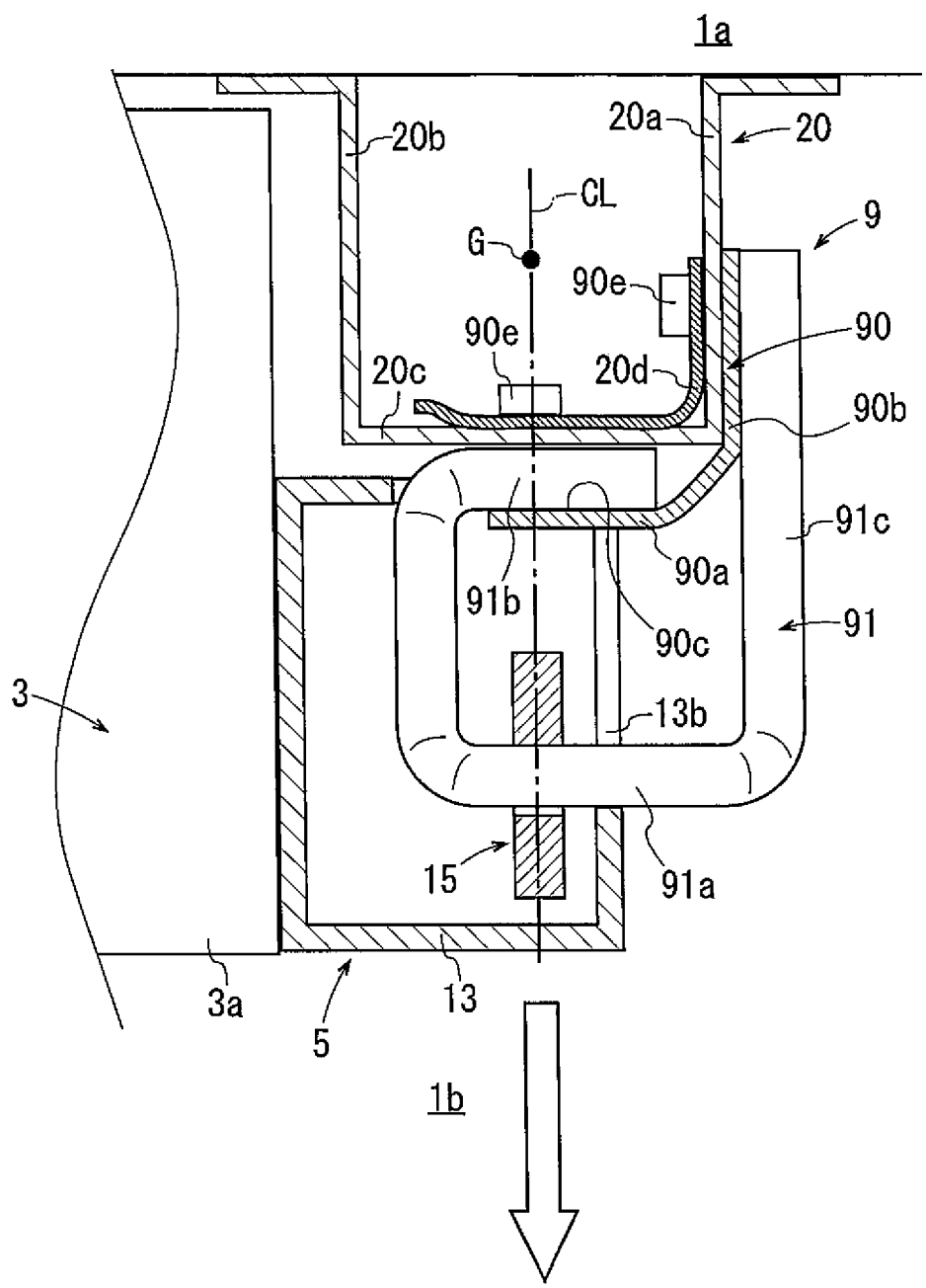
FIG. 4 is a sectional view showing a state where the battery unit is installed in the vehicle body, according to the vehicle battery unit installation apparatus of the first embodiment.

The aforementioned side members 20 each have a pair of frame side walls 20a and 20b and a frame lower wall 20c that is connected to the lower ends of the frame side walls 20a and 20b and extends in the substantially horizontal direction, as shown in FIG. 4. Each side member 20 has a vertical cross section formed in a substantially rectangular U-shape. Inside the side member 20, a back plate 20d having a vertical cross section formed in a substantial L-shape is provided.

Figure 5A:
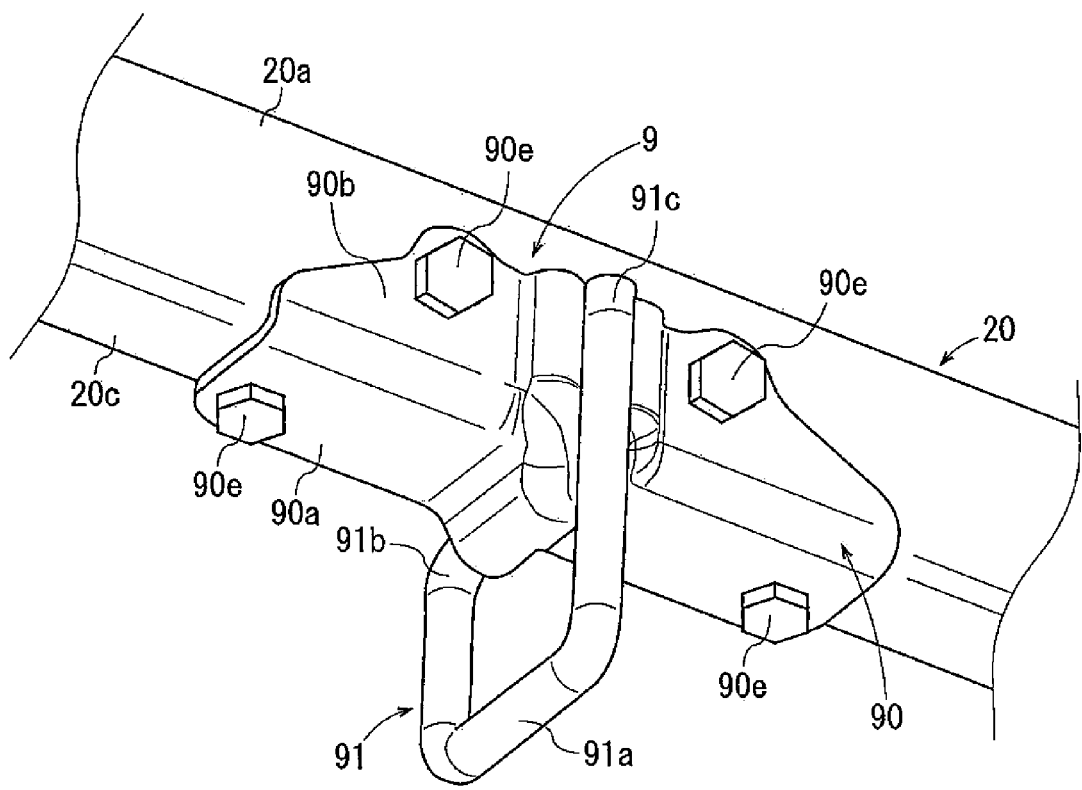
Figure 5B:
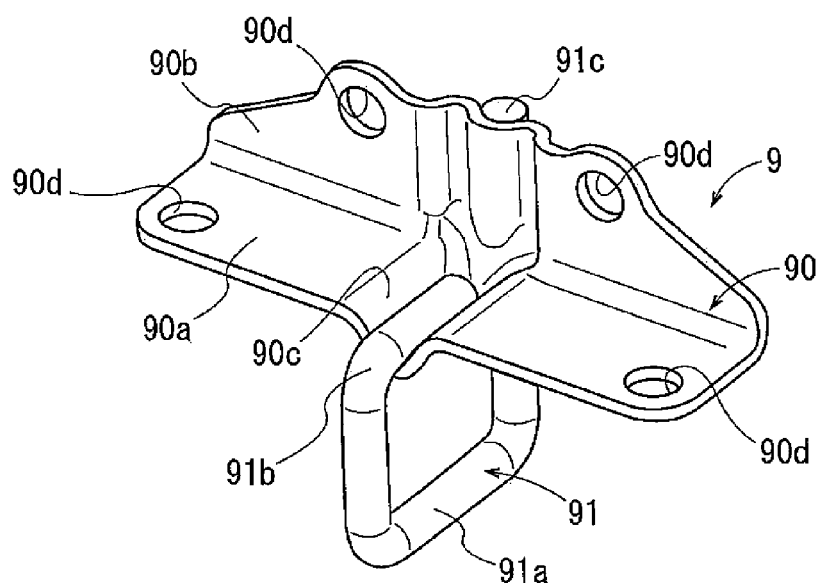

As shown in FIG. 5(A), each striker device 9 has a base plate 90, and a striker 91. The base plate 90 has a base plate lower wall 90a extending substantially parallel to the frame lower wall 20c, and a base plate side wall 90b formed by bending and extending one end of the base plate lower wall 90a along the frame side wall 20a. The base plate 90 has a vertical cross section formed in a substantial L-shape. As shown in FIG. 5(B), a recess 90c is formed on the substantial center of the base plate lower wall 90a. Furthermore, a plurality of bolt holes 90d are formed on each of the base plate lower wall 90a and the base plate side wall 90b.

The striker 91 is made of steel and has a support part 91a extending substantially parallel to the frame lower wall 20c, as shown in FIG. 4. As shown in FIG. 4, bending work is applied to both of the first end 91b and the second end 91c of the striker 91. The first end 91b extends upward from the support part 91a in the substantially vertical direction and thereafter extends parallel to the frame lower wall 20c to be located in the recess 90c of the base plate lower wall 90a. On the other hand, the second end 91c of the striker 91 extends upward in the substantially vertical direction along the base plate side wall 90b from the support part 91a.

As shown in FIG. 5(B), the first end 91b of the striker 91 is welded to the upper surface of the base plate lower wall 90a, namely, the base plate lower wall 90a in the recess 90c. The second end 91c of the striker 91 is welded to the base plate side wall 90b. As shown in FIG. 4, the striker 91 has both ends secured to the base plate 90 such that the support part 91a is located below the side member 20.

As shown in FIG. 5(A), the base plate 90 is secured to the back plate 20d shown in FIG. 4 via the side member 20 with bolts 90e inserted into the respective bolt holes 90d. Consequently, the striker device 9 is secured to the side member 20 in a state where the base plate lower wall 90a and the base plate side wall 90b abut on the frame lower wall 20c and the frame side wall 20a, respectively.

The two striker devices 9 are mounted on each of the side members 20 to be located in the mounting space 1b shown in FIG. 1. In the striker devices 9 mounted on each side member 20, the two strikers 91 face each other in the longitudinal direction. Therefore, the support parts 91a are capable of supporting the load of the battery unit 3 installed in the vehicle body 1a, as shown in FIG. 2. The number of the striker devices 9 to be mounted on the each of the side members 20 can be appropriately changed according to the size or the load of the battery unit 3. In FIG. 1 and FIG. 2, the side member 20 on the rear side of the sheet and the striker devices 9 mounted on this side member 20 are omitted.

Figure 3:
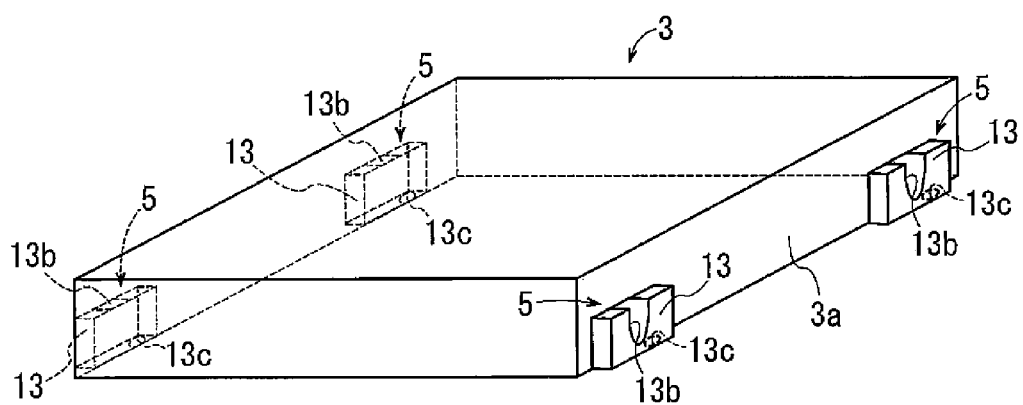
FIG. 3 is a perspective view showing respective positional relations among a battery unit, locking devices, pins, and a placing table, according to a vehicle battery unit installation apparatus of the first embodiment.
Figure 3:
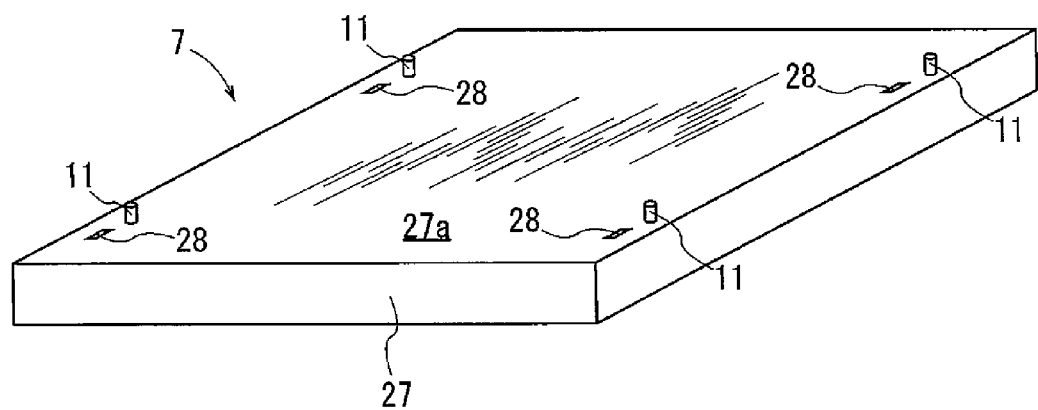

As shown in FIG. 3, the battery unit 3 includes a rectangular box-like case 3a and a plurality of batteries (not shown in detail) housed in the case 3a. The case 3a is provided with connection terminals (not shown) capable of electrically connecting the vehicle body 1a shown in FIG. 1 and the respective batteries. The shape of the case 3a can be appropriately changed according to the shape of the mounting space 1b shown in FIG. 1. This is also applicable to the modifications 1 and 2 described later.

Figure 6:
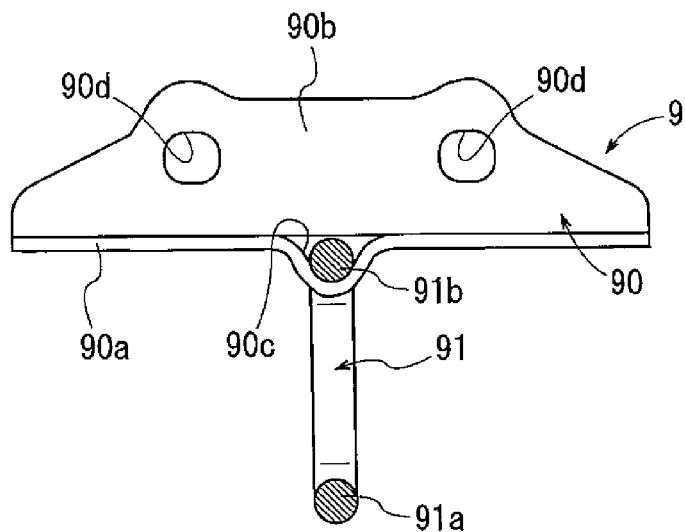
FIG. 6 is a set of sectional views showing the striker device, the locking device, and the placing table, according to the vehicle battery unit installation apparatus of the first embodiment.
Figure 6:
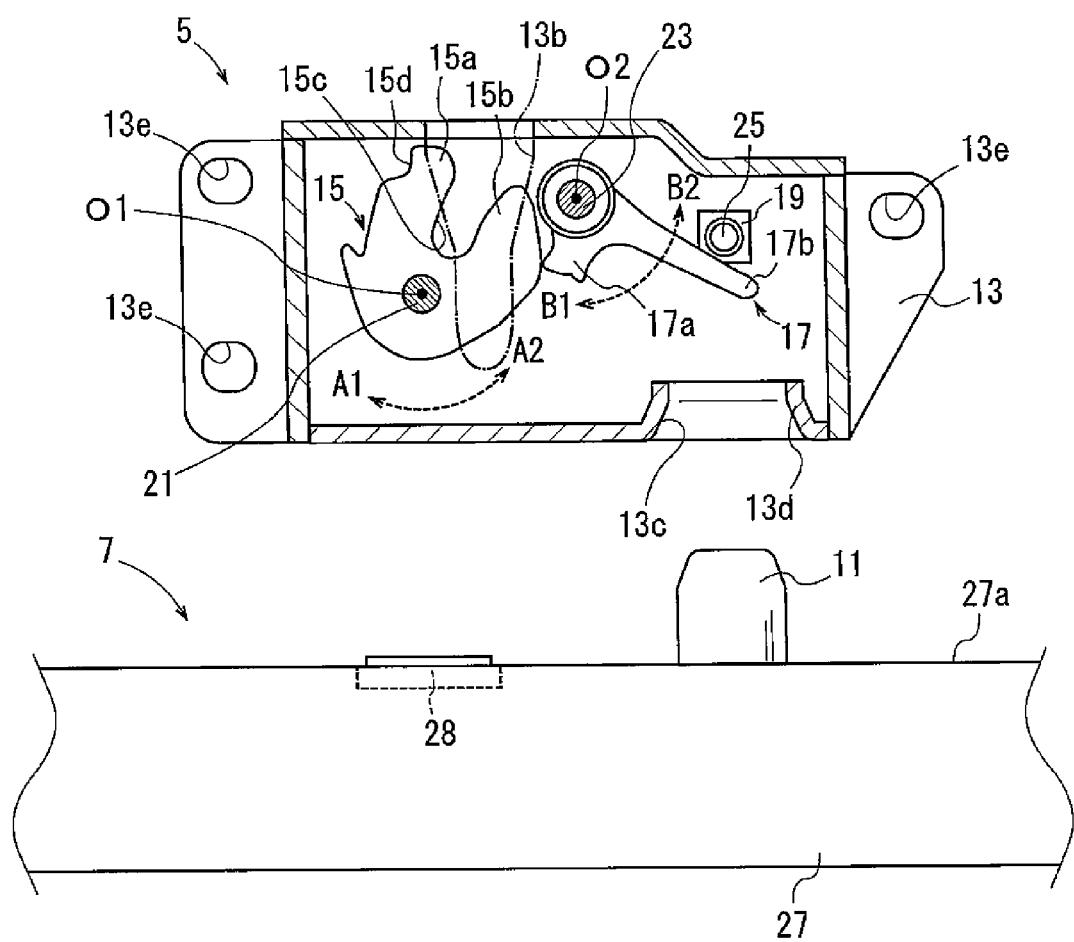

The two locking devices 5 are mounted on each of the side surfaces of the long sides of the case 3a to correspond to the striker devices 9. As shown in FIG. 6, each locking device 5 has a housing 13, a latch 15, a pawl 17, and a second solenoid 19. The second solenoid 19 is secured to a lock pin 25.

As shown in FIG. 3, each housing 13 is secured to the case 3a of the battery unit 3. As shown in FIG. 6, the housing 13 has an entering opening 13b that is opened on an upper end and extends downward to enable the entering of the support part 91a of the striker 91. The housing 13 has an insertion hole 13c that is opened from the lower end toward the inside of the housing 13 to enable the insertion of the pin 11. A guide part 13d for guiding the pin 11 is formed around the insertion hole 13c by applying bending work to the housing 13. Furthermore, the housing 13 is formed with three bolt holes 13e. The housing 13 is secured to the case 3a with bolts (not shown) inserted into the respective bolt holes 13e.

In the housing 13, a first swing shaft 21 and a second swing shaft 23 are provided to protrude horizontally. The shaft center of the first swing shaft 21 is a first swing shaft center O1, and the shaft center of the second swing shaft 23 is a second swing shaft center O2.

A recess 15c is formed on a part of the latch 15, and the latch 15 has a substantial U-shape. The upper side of the recess 15c is an upper pawl part 15a, and the lower side of the recess 15c is a lower pawl part 15b. The support part 91a that enters the entering opening 13b of the housing 13 is configured to be housed in the recess 15c. Furthermore, in the vicinity of the upper pawl part 15a, an engaging surface 15d is formed on a side opposite to the recess 15c.

The latch 15 is pivotally supported with respect to the first swing shaft 21 and can selectively swing in the direction A1 and the direction A2. The latch 15 is urged in the direction A2 by a coil spring (not shown). The latch 15 swings in the direction A1, thereby bringing into a locking state where the support part 91a is locked in the entering opening 13b. The latch 15 swings in the direction A2, thereby bringing into a released state where the support part 91a is released in the entering opening 13b. Thus, the latch 15 swings about the first swing shaft center O1, thereby enabling switching between the locking state and the released state.

Furthermore, as shown in FIG. 4, the latch 15 is arranged in the housing 13 to be located on the vertical line CL passing the centroid G in the cross section of the side members 20, in a state where the battery unit 3 is installed in the vehicle body 1a. In FIG. 4, the members such as the first swing shaft 21 are omitted. Similarly, in FIG. 12 and FIG. 15 described later, the members are omitted.

As shown in FIG. 6, the pawl 17 is formed with a locking piece 17a and an operation piece 17b substantially orthogonal with each other and has a substantial L-shape. The pawl 17 is pivotally supported with respect to the second swing shaft 23 and can selectively swing in the direction B1 and the direction B2. The pawl 17 is urged in the direction B1 by a coil spring (not shown). The pawl 17 swings in the direction B1, thereby causing the locking piece 17a to move a first position where the swing of the latch 15 can be regulated. The pawl 17 swings in the direction B2, thereby causing the locking piece 17a to move a second position where the swing of the latch 15 can be allowed. Thus, the pawl 17 swings about the second swing shaft center O2, thereby enabling switching of the position of the locking piece 17a between the first position and the second position.

Each second solenoid 19 is electrically connected to a controller 7a, described later, by a connection terminal (not shown) arranged on a contact surface of the case 3a and a placing table 27, in a state where the battery unit 3 is placed on the placing table 27. The electrical connection between the second solenoid 19 and the controller 7a is released by separating the placing table 27 from the battery unit 3. The second solenoid 19 is driven by the controller 7a, thereby enabling switching between a state where the lock pin 25 horizontally protrudes in the housing 13 and a state where the lock pin 25 is housed in the second solenoid 19. The lock pin 25 horizontally protrudes in the housing 13, so that the lock pin 25 can regulate the swing of the pawl 17. Additionally, the lock pin 25 is housed in the second solenoid 19, so that the lock pin 25 can release the regulation of the swing of the pawl 17. Other configurations of the second solenoid 19 are similar to those of known solenoids, and therefore the detailed description of the configurations will be omitted.

As shown in FIG. 1, the transfer apparatus 7 includes a base part 33 secured on the lower floor 10b, the placing table 27, a lifting mechanism 36 provided between the base part 33 and the placing table 27. In the vicinity of the transfer apparatus 7, the controller 7a is arranged.

The lifting mechanism 36 includes a lower holding member 31, a pair of a first link member 35 and a second link member 37, and an upper holding member 29. The lower holding member 31 is secured on the base part 33. The lower holding member 31 is formed with a pair of long holes 31a extending horizontally. Similarly, the upper holding member 29 is formed with a pair of long holes 29a extending horizontally. The first and second link members 35 and 37 are formed to have the same length and are pivotally coupled to each other at the central parts thereof by a coupling pin 39. The lower end of the first link member 35 is pivotally coupled to the lower holding member 31 by a coupling shaft 41b. On the other hand, the lower end of second link member 37 is pivotal with respect to the lower holding member 31 and slidable in the long holes 31a by a coupling shaft 41d. The upper end of the second link member 37 is pivotally coupled to the upper holding member 29 by a coupling shaft 41c. On the other hand, the upper end of the first link member 35 is pivotal with respect to the upper holding member 29 and slidable in the long holes 29a by a coupling shaft 41a. The placing table 27 is secured to the upper holding member 29.

In the base part 33, a motor (not shown) and a gear train (not shown) capable of transmitting power to the coupling shaft 41d by the motor is provided. The motor is electrically connected to the controller 7a. An electric direct-operated cylinder or a hydraulic cylinder can be employed in place of the motor.

As shown in FIG. 3, on the surface 27a of the placing table 27, limit switches 28 are mounted at such positions as to abut on the housings 13 of the respective locking devices 5. The placing table 27 is mounted with the four limit switches 28. Each of the limit switches 28 is electrically connected to the controller 7a shown in FIG. 1. Each limit switch 28 detects that the battery unit 3 and the placing table 27 abut on each other by being pressed down by the housing 13 of the corresponding locking device 5, thereby enabling transmission of a detection signal. In place of the limit switches 28, pressure sensors capable of detecting the pressure of the battery unit 3 located on the placing table 27 may be employed.

Each pin 11 is secured on the placing table 27 at such a position as to be inserted into the insertion hole 13c corresponding to the locking device 5 secured to the case 3a of the battery unit 3.

As shown in FIG. 7(A) and FIG. 7(B), each pin 11 vertically extends upward from the surface 27a of the placing table 27. Each pin 11 is connected to the first solenoid 27b provided in the placing table 27 corresponding to the pin 11. Each first solenoid 27b is electrically connected to the controller 7a shown in FIG. 1.

Each first solenoid 27b is driven on the basis of a detection signal of the corresponding limit switch 28 at the time of the removing of the battery unit 3. Each first solenoid 27b can change the corresponding pin 11 between the first length a shown in FIG. 7(A) and the second length β shown in FIG. 7(B). In place of the first solenoids 27b, electric direct-operated cylinders or hydraulic cylinders can be employed.

Each pin 11 protrudes from the surface 27a of the placing table 27 by the first length α shown in FIG. 7(A), so that the battery unit 3 on the placing table 27 can be positioned while the pin 11 is inserted into the corresponding insertion hole 13c (see FIG. 6). Additionally, each pin 11 protrudes from the surface 27a of the placing table 27 by the second length β shown in FIG. 7(B), so that the pin 11 abuts on the pawl 17 shown in FIG. 6 to cause the pawl 17 to swing from the direction B1 to the direction B2, namely, the position of the locking piece 17a can be made swing from the first position to the second position.

In the vehicle battery unit installation apparatus thus configured, the battery unit 3 is installed in the vehicle body 1a and detached from the vehicle body 1a, as described below.

(Installation of Battery Unit 3)

As shown in FIG. 1, the electric vehicle 1 is arranged at a predetermined position of the upper floor 10a of the station 10. At this time, the position of the electric vehicle 1 is adjusted such that the mounting space 1b is located right above the communication opening 10c, namely, right above the transfer apparatus 7. The electric vehicle 1 is not mounted with the battery unit 3 in the mounting space 1b.

Figure 8:
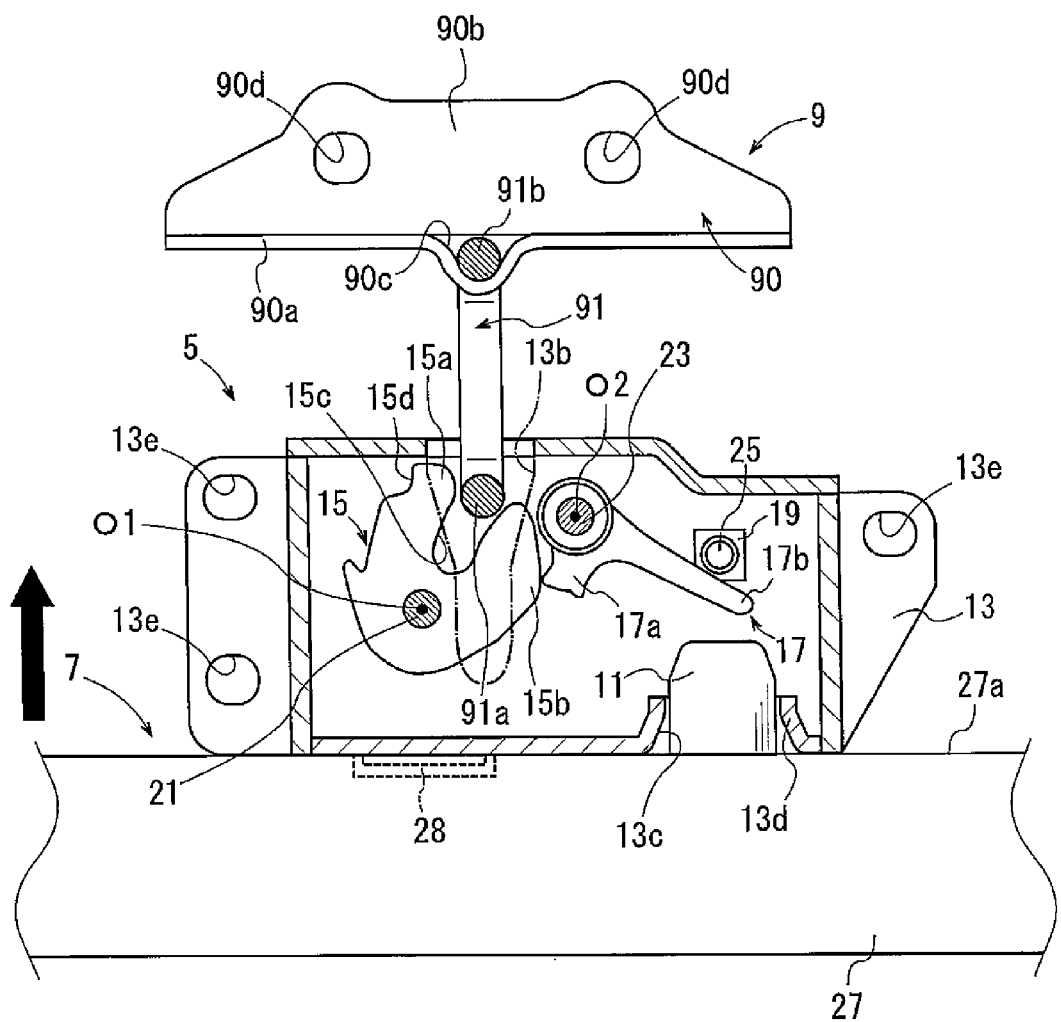
FIG. 8 is a sectional view showing the striker device, the locking device, and the placing table during the rising of the battery unit, according to the vehicle battery unit installation apparatus of the first embodiment.

On the other hand, on the placing table 27 of the transfer apparatus 7, the battery unit 3 is provided. Each pin 11 protrudes from the surface 27a of the placing table 27 by the first length α. In the battery unit 3, in this state, each pin 11 is inserted into the corresponding insertion hole 13c via the corresponding guide part 13d, as shown in FIG. 8. Therefore, the battery unit 3 is positioned on the placing table 27. Each lock pin 25 is housed in the corresponding second solenoid 19, and the pawl 17 is released from the regulation of its swinging motion.

In this state, the placing table 27 is lifted by the controller 7a, and the battery unit 3 is brought closer to the mounting space 1b (see the solid arrow in FIG. 8). Consequently, the support parts 91a of the strikers 91 relatively enter in the entering openings 13b.

Figure 9:
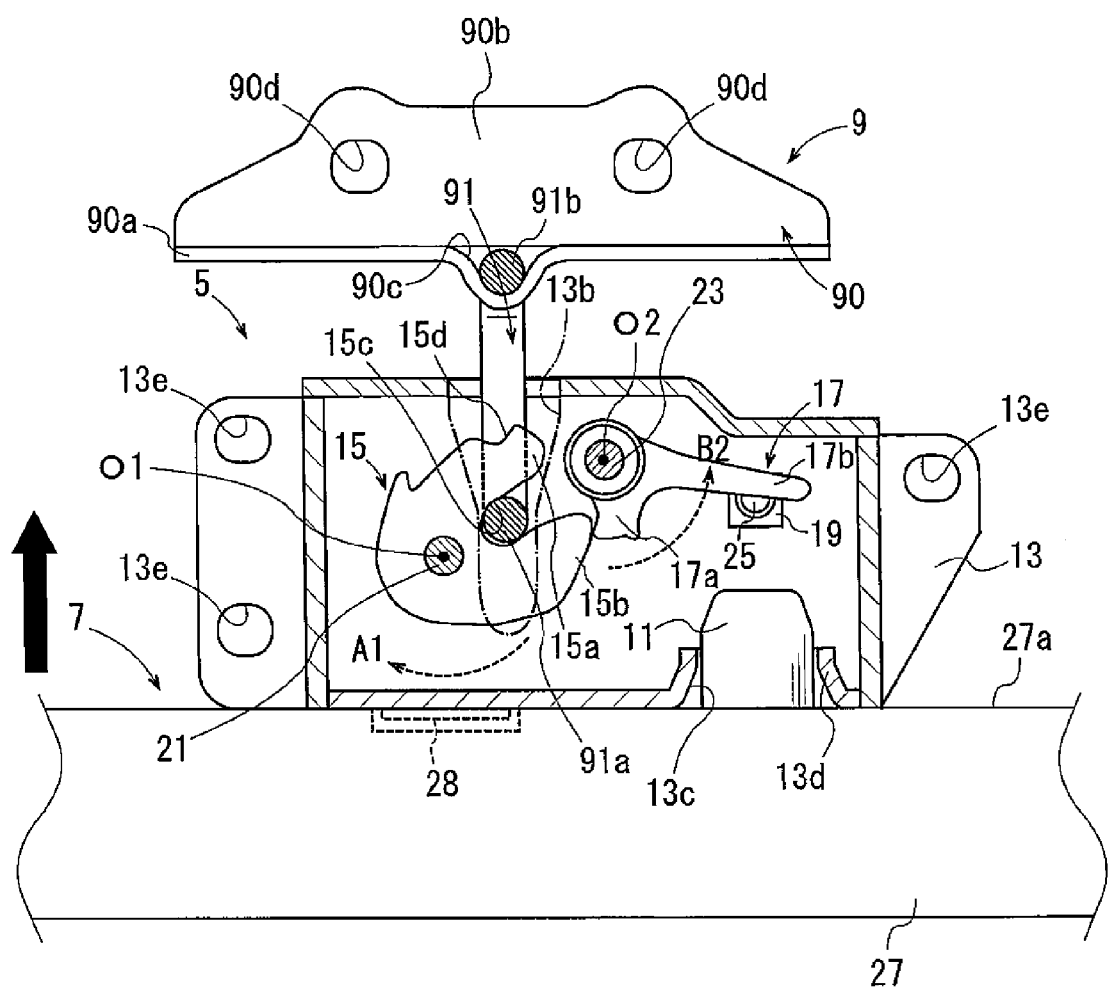
FIG. 9 is a sectional view showing the striker device, the locking device, and the placing table during the rising of the battery unit, according to the vehicle battery unit installation apparatus of the first embodiment.

Then, as shown in FIG. 9, the lower pawl parts 15b of the latches 15 and the support parts 91a abut on each other, and the support parts 91a press the latches 15. Consequently, the latches 15 swing against the urging force of the coil springs in the direction A1 (see the broken arrow in FIG. 9). Additionally, the lower pawl parts 15b of the latches 15 press the locking pieces 17a of the pawls 17. Consequently, the pawls 17 swing in the direction B2 against the urging force of the coil springs, and the locking pieces 17a each move from the first position to the second position (see the broken arrow in FIG. 9).

Figure 10:
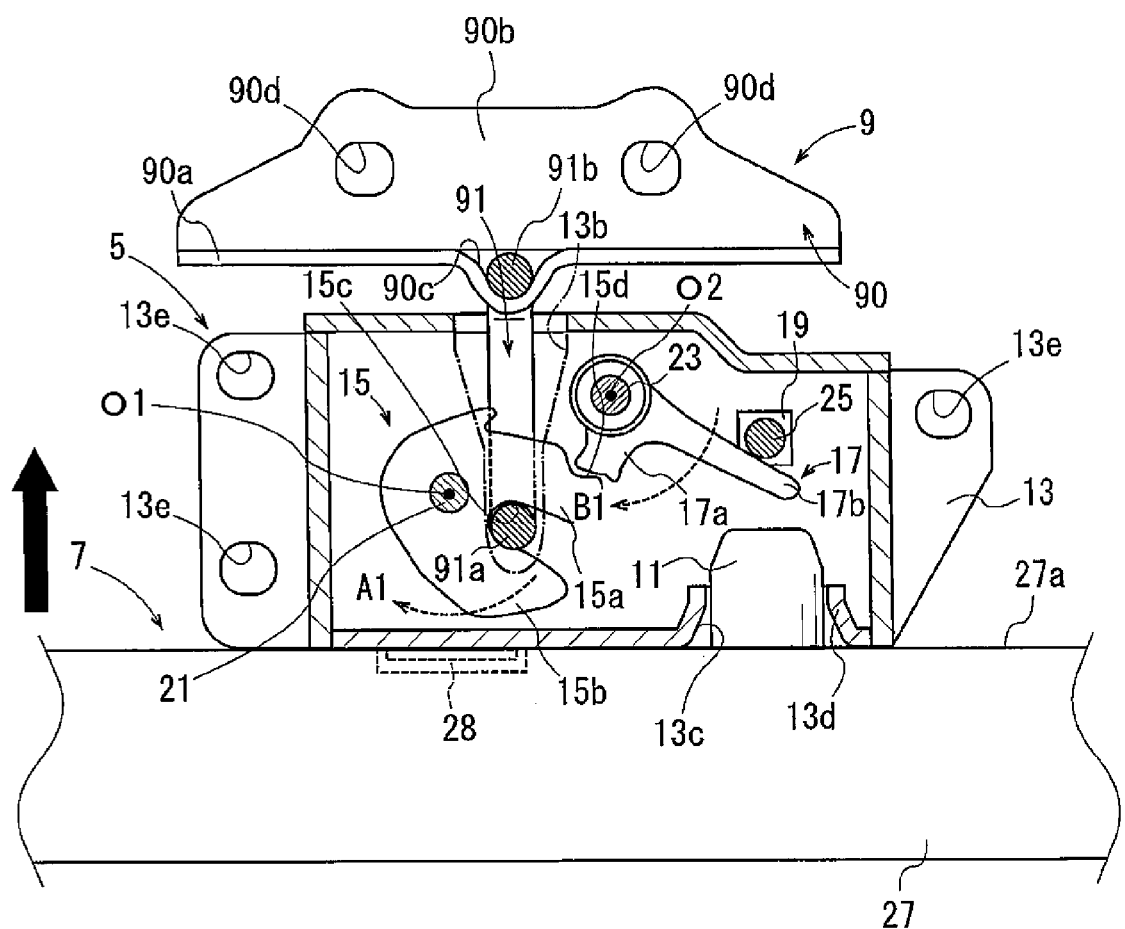
FIG. 10 is a sectional view showing the striker device, the locking device, and the placing table during the rising of the battery unit, according to the vehicle battery unit installation apparatus of the first embodiment.

When the battery unit 3 is located in the mounting space 1b as shown in FIG. 2, the pawls 17 swing in the direction B1 by the urging force of the coil springs, and the locking pieces 17a each move from the second position to the first position (see the broken arrow in FIG. 10), as shown in FIG. 10. Therefore, the locking pieces 17a are engaged with the engaging surfaces 15d of the latches 15. Thus, the latches 15 are brought into a locking state, to lock the support parts 91a in the recesses 15c. At this time, as shown in FIG. 4, the latches 15 each lock the support part 91a on the vertical line CL passing the centroid G in the cross section of the side member 20, namely, right below the frame lower wall 20c. At the same time, the batteries in the battery unit 3 and the electric vehicle 1 are simultaneously electrically connected to each other.

In this state, the controller 7a drives the second solenoids 19 to protrude the lock pins 25 in the housing 13, as shown in FIG. 10. Consequently, the operation pieces 17b of the pawls 17 and the lock pins 25 abut on each other, and the swinging of the pawls 17 from the direction B1 to the direction B2 is secured by the lock pins 25. That is, the locking pieces 17a regulate the movement to the second position. Thus, the lock pins 25 complete to secure the pawls 17, and the pawls 17 complete to secure the latches 15.

Figure 11:
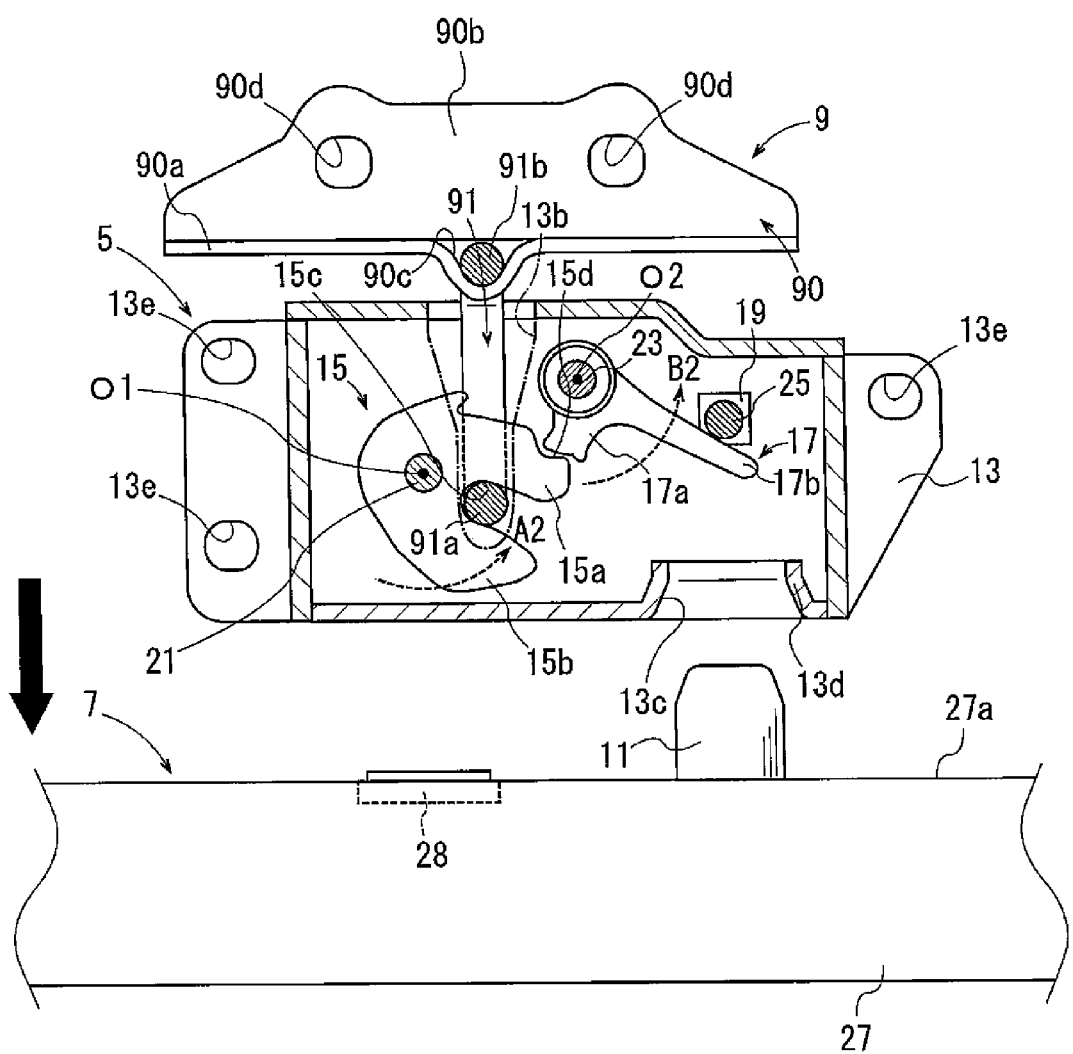
FIG. 11 is a sectional view showing the striker device, the locking device, and the placing table at the time of completing the installation of the battery unit in the vehicle body, according to the vehicle battery unit installation apparatus of the first embodiment.

Thereafter, as shown in FIG. 11, the controller 7a lowers the placing table 27 (see the solid arrow in FIG. 11), and the pins 11 are pulled out from the inside of the insertion holes 13c. Consequently, the locking devices 5 complete to secure the support parts 91a, and installation of the battery unit 3 in the mounting space 1b is completed.

Thus, in the vehicle battery unit installation apparatus, the transfer apparatus 7 lifts the battery unit 3 up to the mounting space 1b, so that the battery unit 3 can be installed in the vehicle body 1a. At this time, in the vehicle battery unit installation apparatus, the pawls 17 secure the swing of the latches 15 in the locking state, and therefore each locking device 5 reliably secures the corresponding support part 91a.

In the vehicle battery unit installation apparatus, in the state where the battery unit 3 is installed in the vehicle body 1a, the latches 15 are located below the side members 20 as shown in FIG. 4. Therefore, in the vehicle battery unit installation apparatus, when the battery unit 3 is installed in the vehicle body 1a, the load (see the white arrow in FIG. 4) of the battery unit 3 acts only on the side members 20. Furthermore, the latches 15 each are located on the vertical line CL passing the centroid G in the cross section of the side members 20, so that only the vertically downward load of the battery unit 3 acts on the centroid G being the center of the strength of each side member 20. Consequently, in the vehicle battery unit installation apparatus, a load does not act on each side member 20 in such a direction that the side member 20 is twisted. Therefore, in the vehicle battery unit installation apparatus, the battery unit 3 can be reliably installed in the vehicle body 1a. Hereinafter, description will be made by contrast with a vehicle battery mounting apparatus of a comparative example.

(Comparative Example)

Figure 12:
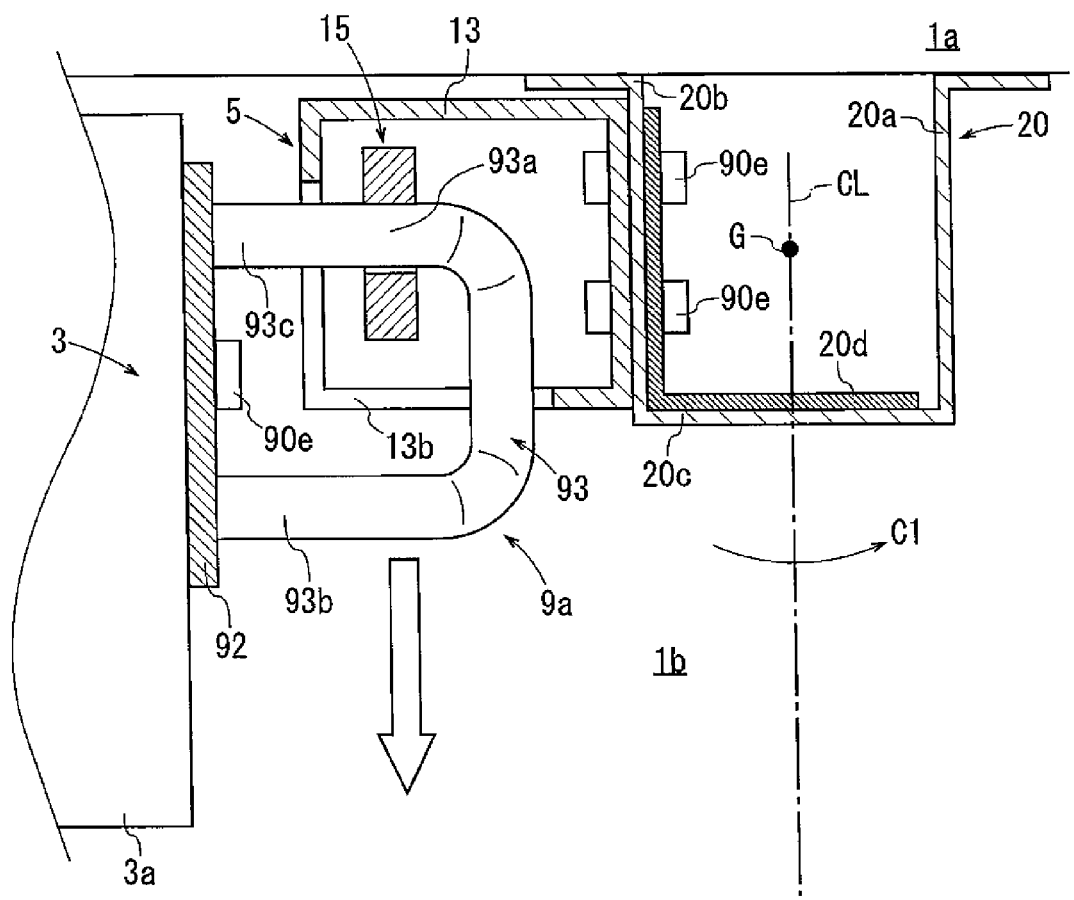
FIG. 12 is a sectional view showing a state where a battery unit is installed in a vehicle body, according to a vehicle battery unit installation apparatus of a comparative example.

As shown in FIG. 12, according to the vehicle battery unit mounting apparatus of the comparative example, striker devices 9a are mounted with a battery unit 3, and locking devices 5 are mounted on side members 20. Each of the striker devices 9a has a base plate 92 and a striker 93. The striker 93 has a support part 93a substantially parallel to a frame lower wall 20c. Substantially vertical bending work is applied to the striker 93 twice from the support part 93a toward a first end 93b. The striker 93 has a substantial U-shape. The first end 93b and a second end 93c of the striker 93 are welded to the base plate 92, so that the striker 93 is secured to the base plate 92. The base plate 92 is secured to a case 3a via a bolt 90e. Additionally, the locking device 5 is secured to a back plate 20d by bolts 90e, to abut on the frame side wall 20b.

In such a vehicle battery unit installation apparatus of the comparative example, as described above, when a transfer apparatus 7 lifts the battery unit 3 up to a mounting space 1b, and the battery unit 3 is installed in a vehicle body 1a, the load (see the white arrow in FIG. 12) of the battery unit 3 vertically acts on latches 15. In the vehicle battery unit installation apparatus of the comparative example, the centroid G, which is the center of the strength of each side member 20, and the latch 15, on which the load of the battery unit 3 acts, are separated horizontally. Therefore, in the vehicle battery unit installation apparatus of the comparative example, torsional force in the direction C1 is generated about the centroid G on each side member 20 by the vertical load acting on the latch 15, and the battery unit 3 cannot be sufficiently installed in the vehicle body.

Accordingly, in the vehicle battery unit installation apparatus of the comparative example, in order to obtain reliability similar to the vehicle battery unit mounting apparatus of the aforementioned first embodiment, the strength of each side member 20 needs to be increased by increasing the place thickness of each side member 20, or further providing a reinforcing part on the side member 20. However, in this case, the weight of the vehicle battery unit installation apparatus of the comparative example is greater than that of the vehicle battery unit mounting apparatus of the first embodiment.

(Detaching of Battery Unit 3)

As shown in FIG. 2, the electric vehicle 1 is arranged at a predetermined position of the upper floor 10a of the station 10. Also at this time, the position of the electric vehicle 1 is adjusted such that the mounting space 1b is located right above the communication opening 10c, namely, right above the transfer apparatus 7. The electric vehicle 1 is mounted with the battery unit 3 in the mounting space 1b.

On the other hand, on the placing table 27 of the transfer apparatus 7, the battery unit 3 is not provided. Each pin 11 protrudes from the surface 27a of the placing table 27 by the first length $\alpha$.

Figure 13:
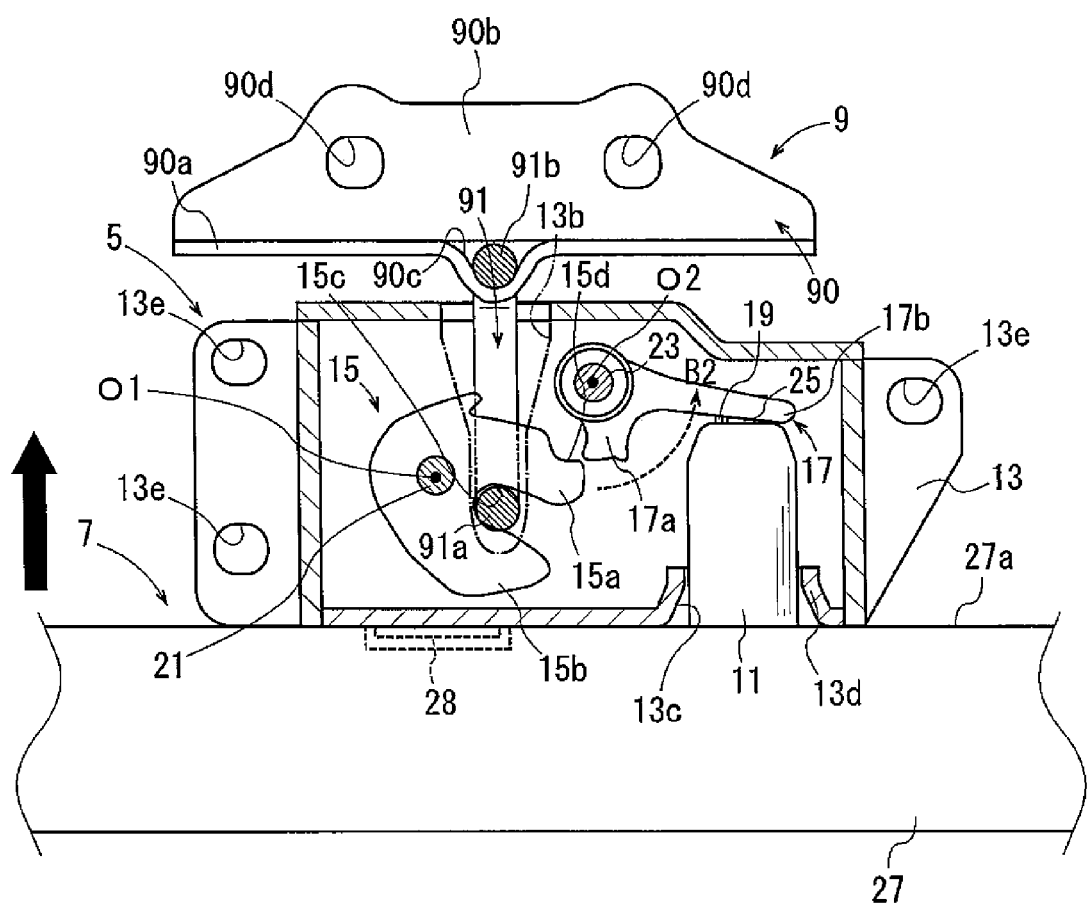
FIG. 13 is a sectional view showing the striker device, the locking device, and the placing table at the time of detaching the battery unit from the vehicle body, according to the vehicle battery unit installation apparatus of the first embodiment.

In this state, the controller 7a lifts the placing table 27, as shown in FIG. 13. Then, while each pin 11a on the placing table 27 is inserted into the corresponding insertion hole 13c, the placing table 27, and the battery unit 3 and the locking devices 5 abut on each other. At this time, each pin 11 is inserted into the corresponding insertion hole 13c while being guided by the corresponding guide part 13d, and therefore the placing table 27 is positioned with respect to the battery unit 3. Additionally, the battery unit 3 and the placing table 27 come into contact with each other, so that the second solenoids 19 and the controller 7a are electrically connected to each other.

Furthermore, the placing table 27, and the battery unit 3 and the locking devices 5 abut on each other, thereby pressing down each limit switch 28 to transmit a detection signal. By the detection signal, each second solenoid 19 is driven, so that the corresponding lock pin 25 is housed in the second solenoid 19. Thus, the regulation of the swing of each pawl 17 is released. Next, the controller 7a drives each first solenoid 27b. Consequently, the pin 11 protrudes from the surface 27a of the placing table 27 by the second length $\beta$. The operation piece 17b of the pawl 17 is pressed by the pin 11 protruding by the second length $\beta$, so that the pawl 17 swings in the direction B2 (see the broken arrow in FIG. 13) against the urging force of the coil spring. Therefore, the locking piece 17a moves from the first position to the second position. Accordingly, engagement of the engaging surface 15d of the latch 15 and the locking piece 17a is released, and the securing of latch 15 by the pawl 17 is released.

Figure 14:
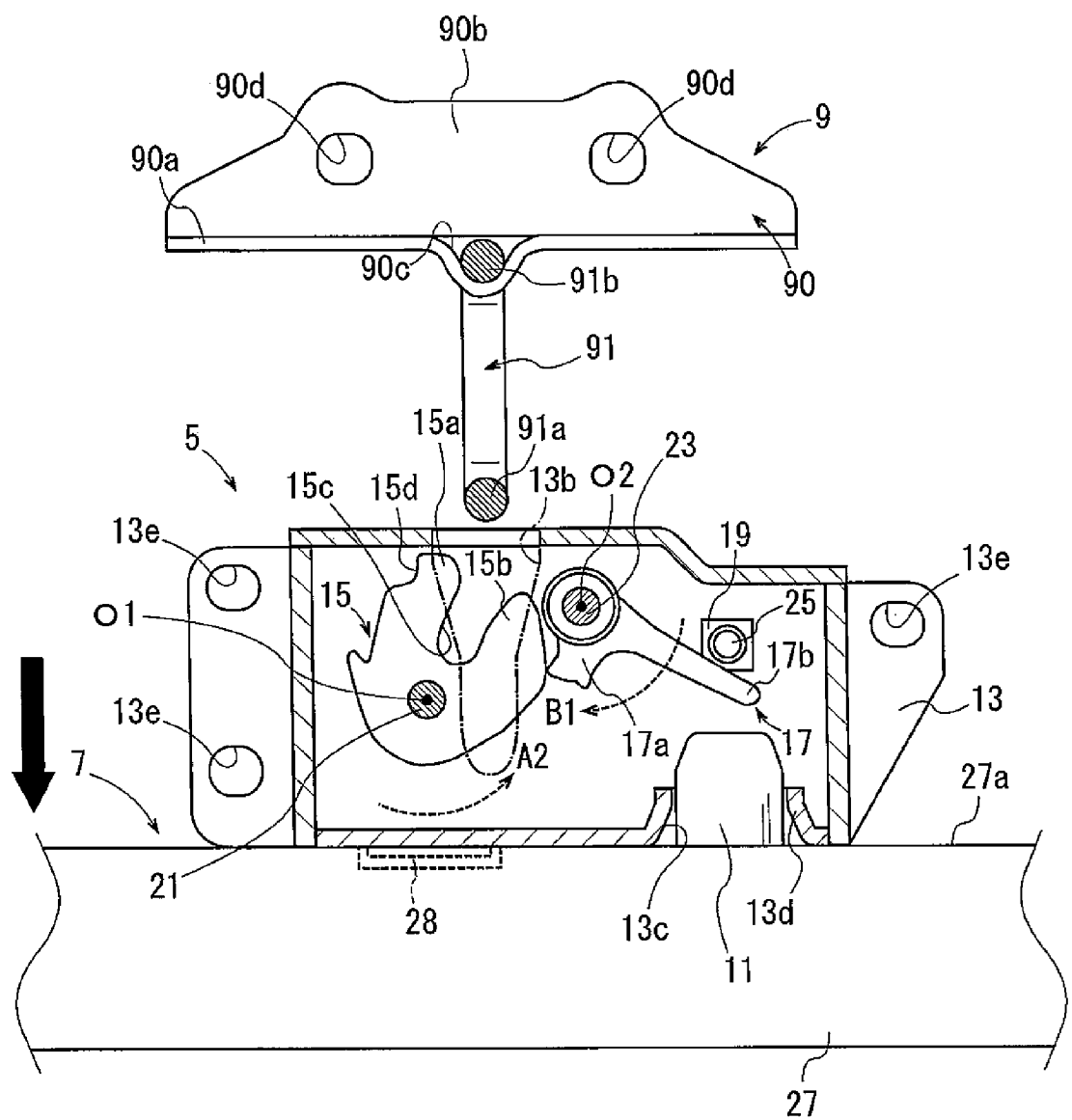
FIG. 14 is a sectional view showing the striker device, the locking device, and the placing table during the lowering of the battery unit, according to the vehicle battery unit installation apparatus of the first embodiment.

As shown in FIG. 14, the placing table 27 is lowered, thereby moving the battery unit 3 downward from the inside of the mounting space 1b (see the solid arrow in FIG. 14). Consequently, the upper pawl parts 15a of the latches 15 are pressed by the support parts 91a and are swung in the direction A2 with urging force of the coil springs, thereby bringing the latches 15 into a released state. Therefore, the support parts 91a relatively move in such a direction as to separate from the entering openings 13b. Thus, the securing of the support parts 91a by the locking devices 5 is released, and the detaching of the battery unit 3 from the vehicle body 1a is completed. At this time, electrical connection between the batteries in the battery unit 3 and the electric vehicle 1 is simultaneously released.

After the detaching of the battery unit 3 is completed, the controller 7a drives the first solenoids 27b, so that the pins 11 are moved to protrude by the first length $\alpha$. Consequently, the pressing by the pins 11 to the operation pieces 17b are released. Therefore, by the urging force of the coil springs, the pawls 17 are swung in the direction B1, and the locking pieces 17a move from the second position to the first position. Thereafter, the battery unit 3 completely detached moves from the placing table 27. The protruding length of each pin 11 is changed from the second length $\beta$ to the first length $\alpha$ before the battery unit 3 moves from the placing table 27, so that the damage of the pins 11 can be prevented.

Accordingly, in the vehicle battery unit installation apparatus of the first embodiment, the battery unit 3 can be reliably installed in the vehicle body 1a, and the battery unit 3 installed in the vehicle body 1a can be easily detached.

Particularly, in the vehicle battery unit installation apparatus, the frame lower walls 20c and the base plate lower walls 90a are substantially parallel to each other, and hence the base plate lower walls 90a can be suitably secured to the frame lower walls 20c. Consequently, in the vehicle battery unit installation apparatus, each striker device 9 is firmly secured to the corresponding side member 20, and the aforementioned load of the striker device 9 can be suitably shared by the side member 20.

The ends of each striker 91 are secured to the base plate lower wall 90a and the base plate side wall 90b, and hence in the vehicle battery unit installation apparatus, the ends of the support part 91a are reliably supported by the base plate 90. At this time, the first end 91b of the striker 91 is secured to the base plate lower wall 90a in a state of being placed in the recess 90c of the upper surface of the base plate lower wall 90a, and hence one end of the support part 91a is reliably supported in the recess 90c of the upper surface of the base plate lower wall 90a. Thus, in the vehicle battery unit installation apparatus, the durability of each striker device 9 is improved, and reliability of the installation of the battery unit 3 in the vehicle body 1a is improved.

Furthermore, each base plate 90 is secured to the side member 20 by the plurality of bolts 90e. The side member 20 is provided with the back plate 20d joined with the base plate 90 by the bolts 90e. Therefore, in the vehicle battery unit installation apparatus, each striker device 9 can be easily secured to the side member 20. Additionally, the necessary part of the side member 20 is reinforced by the back plate 20d, and hence the side member 20 can be effectively reinforced.

(Second Embodiment)

Figure 15:
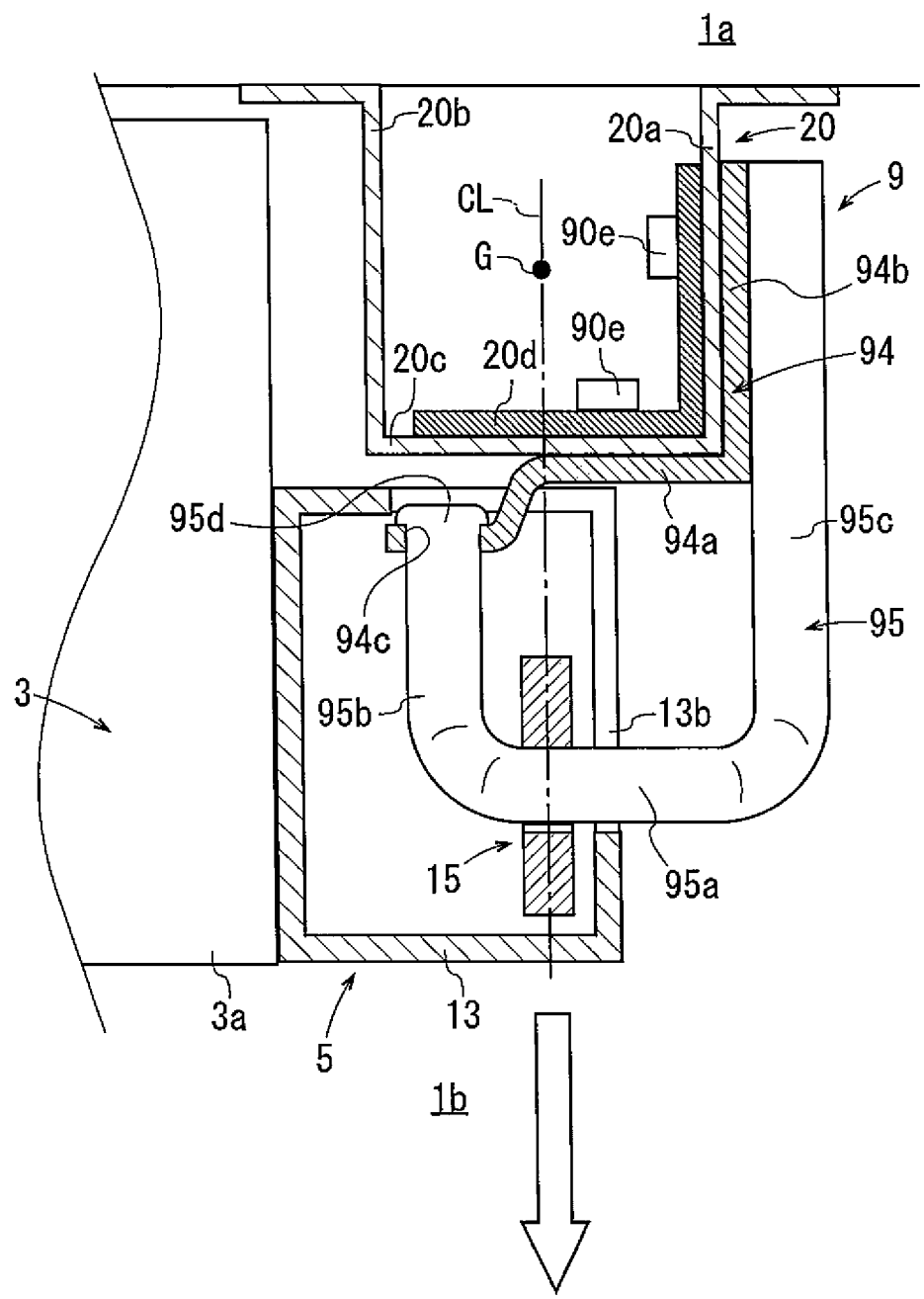
FIG. 15 is a sectional view showing a state where a battery unit is installed in a vehicle body, according to a vehicle battery unit installation apparatus of a second embodiment.

As shown in FIG. 15, striker devices 9 according to the vehicle battery unit installation apparatus of the second embodiment each have a base plate 94 and a striker 95. The base plate 94 has a base plate lower wall 94a extending substantially parallel to a frame lower wall 20c, and a base plate side wall 94b formed by bending and extending an end of the base plate lower wall 94a along a frame side wall 20a. Additionally, the base plate lower wall 94a has a tip end to which bending work is applied and is formed with a fitting hole 94c. Other configurations of the base plate 94 are similar to those of the base plate 90.

Each striker 95 has a support part 95a extending substantially parallel to the frame lower wall 20c. Additionally, the striker 95 has a first end 95b and a second end 95c extending upward from the support part 95a in the substantially vertical direction. Then, after the first end 95b of the striker 95 is inserted into the fitting hole 94c, the end surface 95d of the first end 95b is crushed, so that the first end 95b is secured to the base plate lower wall 94a. On the other hand, the second end 95c of the striker 95 is welded to the base plate side wall 94b. Consequently, in the striker 95, the ends of the striker 95 are secured to the base plate 94 such that the support part 95a is located below the side members 20. Other configurations of the vehicle battery unit installation apparatus are similar to those of the vehicle battery unit installation apparatus of the first embodiment, the same configurations are denoted by the same reference numerals, and the detailed description thereof will be omitted.

In the vehicle battery unit installation apparatus, the load of the battery unit 3 at the time of installation is shared by the ends of the support parts 95a to be transmitted to the base plates 94, and supported by the side members 20. Therefore, also in the vehicle battery unit installation apparatus, the battery unit 3 can be firmly installed in the vehicle body 1a. Other working effects are similar to those of the vehicle battery unit installation apparatus of the first embodiment.

(Modification 1)

Figure 16:
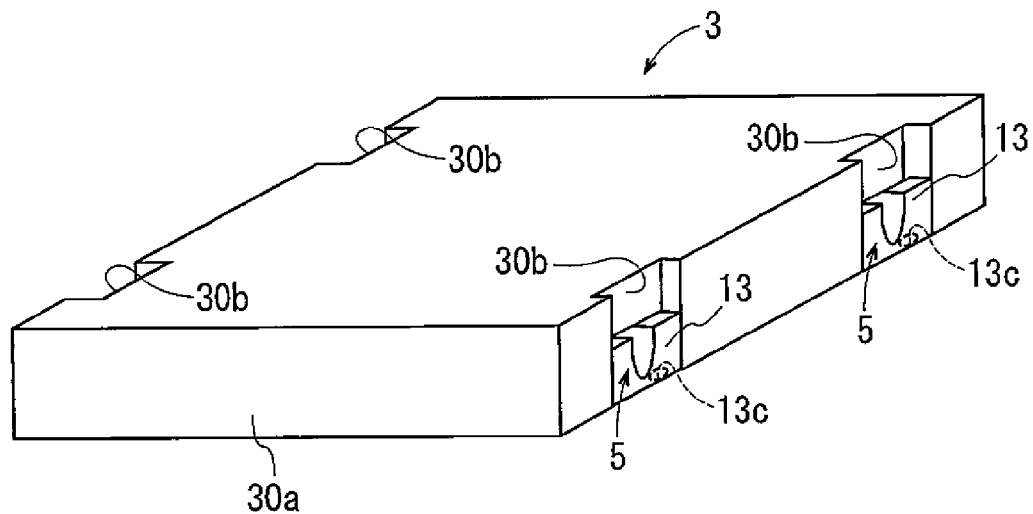
FIG. 16 is a perspective view showing a battery unit and a locking device, according to a vehicle battery unit installation apparatus of a modification 1.

In a vehicle battery unit installation apparatus of a modification 1, the configuration of the case 3a of the aforementioned battery unit 3 is modified. As shown in FIG. 16, a battery unit 3 has a case 30a. The case 30a is formed with four recesses 30b. Locking devices 5 are secured to the case 30a in a state where being arranged in the corresponding recesses 30b.

According to the case 30a of the battery unit 3, the locking devices 5 do not protrude from the battery unit 3, so that the mounting space 1b can be downsized. Other working effects are similar to those of the vehicle battery unit installation apparatus of the first embodiment.

(Modification 2)

Figure 17:
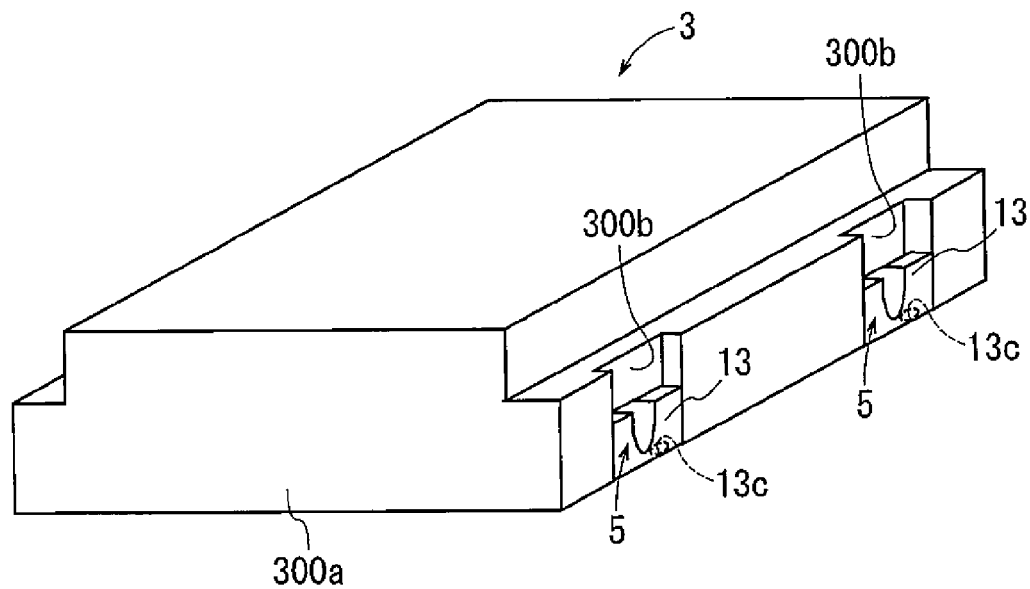
FIG. 17 is a perspective view showing a battery unit and a locking device, according to a vehicle battery unit installation apparatus of a modification 2.

In the vehicle battery unit installation apparatus of the modification 2, the configuration of the battery unit 3 in the modification 1 is further modified. As shown in FIG. 17, a battery unit 3 has a case 300a. The case 300a is formed with four recesses 300b and is formed to protrude in the height direction. Each locking device 5 is secured to the case 300a in a state of being arranged in the corresponding recess 300b.

According to the case 300a of the battery unit 3, a larger number of batteries can be housed compared to the aforementioned case 3a or case 30a. Therefore, the battery unit 3 having the case 300 enables the electric vehicle 1 to travel a longer distance. The case 300a is formed to have a reduced length in the longitudinal direction or the width direction, so that the length of the battery unit 3 in the longitudinal direction or the width direction can be reduced without reduction in the number of batteries to be housed. Therefore, with the case 300a, the degree of freedom of design in the vehicle body 1a can be improved. Other working effects are similar to those of the vehicle battery unit installation apparatuses of the first embodiment and the modification 1.

As described above, the present invention is described based on the first and second embodiments, and the modifications 1 and 2. However, the present invention is not limited to the first and second embodiments, and the modifications 1 and 2, and, of course, can be appropriately modified without departing from the spirit thereof.

For example, a detection unit capable of detecting the locking state and the released state of each latch 15 to transmit a detection signal can be provided. The controller 7a may drive each second solenoid 19 to protrude or house the corresponding lock pin 25, on the basis of the detection signal. In this case, misoperation is prevented at the time of the securing and detaching of the battery unit 3.

In each of the first and second embodiments, the mounting space 1b capable of mounting the battery unit 3 is formed in the electric vehicle 1. However, the present invention is not limited to such a shape. Any electric vehicle capable of installing the battery unit on the lower surface of the vehicle body 1a may be employed.

In each of the first and second embodiments, each side member 20 is formed in a rectangle where the frame lower wall 20c extends horizontally. However, the present invention is not limited to this. The frame lower wall 20c may be formed to incline with respect to the width direction of the vehicle body 1a, or the side member may have a polygon. Furthermore, the connection portions of the frame lower wall 20c, and the frame side walls 20a and 20b may be chamfered. In a case where the connection portions are chamfered, the base plate 90 similarly chamfered can be employed.

In each of the first and second embodiments, each back plate 20d is arranged inside the side member 20. However, the present invention is not limited to this. The back plate 20d may be arranged outside the side member 20. In this case, the base plate 90 and the side member 20 are secured by the bolts 90e via the back plate 20d.

In the first embodiment, only the first end 91b of each striker 91 is welded to the upper surface of the base plate lower wall 90a. However, the present invention is not limited to this. The first end 91b and the second end 91c of the striker 91 may be welded to the upper surface of the base plate lower wall 90a. In this case, the second end 91c of the striker 91 is preferably located on the upper surface of the base plate lower wall 90a by providing a notch in the base plate side wall 90b, or including only the base plate lower wall 90a in the base plate 90.

The invention claimed is:

1. A vehicle battery unit installation apparatus for installing a battery unit in a lower part of a vehicle body, wherein the vehicle body has a frame configuring a part of a lower surface of the vehicle body in a state where the battery unit is not installed, and the vehicle battery unit installation apparatus comprises:

a striker device configured to be secured to the vehicle body, wherein the striker device includes a base plate and a striker secured to the base plate, and wherein the striker has a support part capable of supporting a load; and a locking device secured to the battery unit and capable of securing the support part, wherein the base plate is configured to be secured to the frame, the striker has ends secured to the base plate such that the support part is located below the frame and wherein at least a portion of the base plate is disposed above the support part and below the frame along a vertical line passing through a cross section of a centroid of the frame in a state where the battery unit is installed in the vehicle body, the frame has a pair of frame side walls and a frame lower wall connected to lower ends of the frame side walls, the base plate has a base plate lower wall extending substantially parallel to the frame lower wall and secured to the frame lower wall, and at least a first end of the striker extends upward from the support part, extends parallel to the base plate lower wall, and is welded to an upper surface of the base plate lower wall.

2. The vehicle battery unit installation apparatus according to claim 1, wherein the base plate has a base plate side wall formed by bending and extending an end of the base plate lower wall along the frame side walls, and a second end of the striker extends upward from the support part and is welded to the base plate side wall.

3. The vehicle battery unit installation apparatus according to claim 1, wherein the base plate is secured to the frame with a plurality of bolts, and the frame is provided with a back plate jointed with the base plate by means of the bolts.

4. The vehicle battery unit installation apparatus according to claim 1, wherein the locking device includes:

a housing having an entering opening enabling entering of the support part;

a latch pivotally supported about a first swing shaft center with respect to the housing and enabling switching between a locking state, in which the support part is locked in the entering opening, and a released state, in which the support part is released in the entering opening; and a pawl capable of regulating swing of the latch, wherein the latch is located on the vertical line passing the centroid in the cross section of the frame in the state where the battery unit is installed in the vehicle body.

5. The vehicle battery unit installation apparatus according to claim 4, wherein the pawl is pivotally supported about a second swing shaft center with respect to the housing between a first position, at which swinging of the latch can be regulated, and a second position, at which swinging of the latch can be allowed, the vehicle battery unit installation apparatus further comprising a lock releasing part configured to swing the pawl from the first position to the second position.

6. The vehicle battery unit installation apparatus according to claim 1, wherein the frame includes a plurality of side members extending in a longitudinal direction of the vehicle body, the base plate is secured to each of the side members, and the locking device is provided on a side surface of the battery unit.

* * * * *